US009819387B2

(12) United States Patent
Kwon et al.

(10) Patent No.: US 9,819,387 B2
(45) Date of Patent: Nov. 14, 2017

(54) SYSTEM AND METHOD FOR CHANNEL PROBABILITY MASS FUNCTION DEPENDENT FREQUENCY HOPPING

(71) Applicants: Wichita State University, Wichita, KS (US); The United States of America as represented by the Secretary of the Air Force, Washington, DC (US)

(72) Inventors: Hyuck M. Kwon, Wichita, KS (US); Matthew R. Hannon, Wichita, KS (US); Khanh D. Pham, Albuquerque, NM (US)

(73) Assignees: WICHITA STATE UNIVERSITY, Wichita, KS (US); THE UNITED STATES OF AMERICA AS REPRESENTED BY THE SECRETARY OF THE AIR FORCE, Washington, DC (US)

( * ) Notice: Subject to any disclaimer, the term of this patent is extended or adjusted under 35 U.S.C. 154(b) by 0 days.

(21) Appl. No.: 14/926,833

(22) Filed: Oct. 29, 2015

(65) Prior Publication Data
US 2017/0126275 A1    May 4, 2017

(51) Int. Cl.
*H04B 1/00* (2006.01)
*H04B 1/7143* (2011.01)
*H04W 24/08* (2009.01)
*H04B 1/715* (2011.01)
*H04B 7/06* (2006.01)

(52) U.S. Cl.
CPC .......... *H04B 1/7143* (2013.01); *H04B 1/715* (2013.01); *H04B 7/0626* (2013.01); *H04W 24/08* (2013.01); *H04B 2001/7152* (2013.01)

(58) Field of Classification Search
CPC combination set(s) only.
See application file for complete search history.

(56) References Cited

U.S. PATENT DOCUMENTS

| 5,995,533 A * | 11/1999 | Hassan | H04J 13/00 375/140 |
| 2006/0280298 A1* | 12/2006 | Hauge | G06F 21/10 380/30 |
| 2007/0064770 A1* | 3/2007 | Horiguchi | H04B 1/715 375/133 |
| 2010/0091818 A1* | 4/2010 | Sen | H04B 1/715 375/136 |

* cited by examiner

*Primary Examiner* — Wednel Cadeau
(74) *Attorney, Agent, or Firm* — Hovey Williams LLP (57) ABSTRACT

A system and method for generating a channel statistics dependent frequency hopping pattern that requires low computational complexity and simultaneously maximizes channel capacity and minimizes the symbol error rate or bit error rate under partial band tone interference and Rician or other fading environments. The system includes one or more transmitting units and one or more receiving units communicating over a wireless communication network. A signal generated at one of the transmitting units is modified via the channel statistics dependent frequency hopping pattern as generated via one of the receiving units for improved signal accuracy and avoiding interferer detection and/or interference hits.

7 Claims, 6 Drawing Sheets

SYSTEM AND METHOD FOR CHANNEL PROBABILITY MASS FUNCTION DEPENDENT FREQUENCY HOPPING

FEDERALLY SPONSORED RESEARCH OR DEVELOPMENT

This invention was made with government support under Grant #R51249 awarded by the U.S. Air Force Research Laboratory, Grant #R51255 awarded by the United States Air Force Asian Office of Aerospace Research and Development (AOARD), and the 2015 Air Force Summer Faculty Fellowship. The United States government has certain rights in the invention.

FIELD

The present invention relates to systems and methods for generating adaptive frequency hopping patterns for wireless communications.

BACKGROUND

Frequency hopping refers to the transmission of wireless signals by rapidly switching frequencies using a pattern known to both the transmitter and the receiver. Most existing frequency hopping patterns are determined by two encryption keys, including one for the frequency domain and another for time permutation in the time domain. Such frequency hopping is beneficial because it reduces interference and/or noise and, thus, improves the success rate of signal packet transmission when transmitting a signal over a wireless communication network.

Both frequency-hopping and time-permutation keys used in the communications can reduce the probability of detection by malicious interferers or eavesdroppers; however, they cannot reduce the probability of hits in frequency by an interferer. This is because the frequency hopping pattern generated by the existing methods is generally random (i.e., uniformly distributed over the entire spectrum) and independent of channel conditions.

Recently, a dynamic frequency hopping pattern instead of a fixed frequency hopping pattern was adopted in the IEEE 802.22 standard for cognitive radio-based wireless area network (WRAN) applications. A multiple-access (MA) user's signal hops between frequencies sequentially and cyclically in the entire spectrum, and different MA users use different sequence start times to avoid collisions. However, such dynamic frequency hopping patterns are independent of interference conditions, and a user's signal spectrum occupies the entire spectrum. Therefore, the spectrum can cause interference with the same probability as the random frequency hopping pattern by partial band tone interference (PBTI). In addition, the frequency hopping pattern is cyclic, and thus an interferer can detect the frequency hopping pattern of a user with high probability.

SUMMARY

The present invention solves the above-described problems and provides a distinct advance in the art of frequency hopping sequence generation. More particularly, the present invention provides a system and method for transmitting signals via adaptive channel statistics dependent frequency hopping.

An embodiment of the present invention is a method of transmitting data over a wireless communication network. The method broadly includes generating a frequency hopping pattern spanning a number of time hops and signal frequencies, generating a signal incorporating the frequency hopping pattern, and transmitting the signal. The frequency hopping pattern may be adaptively dependent upon channel state information for each of the signal frequencies.

An additional embodiment of the present invention is directed to another method of transmitting data over a wireless communication network. The method includes generating a signal, encrypting the signal, modulating the signal via an M-ary phase shift keying scheme, generating an initial frequency hopping pattern spanning a number of signal frequencies and time hops, incorporating the frequency hopping pattern into the signal, transmitting the signal, adapting the signal according to a channel statistics dependent frequency hopping pattern influenced by partial band tone interference, and continuing to transmit the signal according to the channel statistics dependent frequency hopping pattern.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
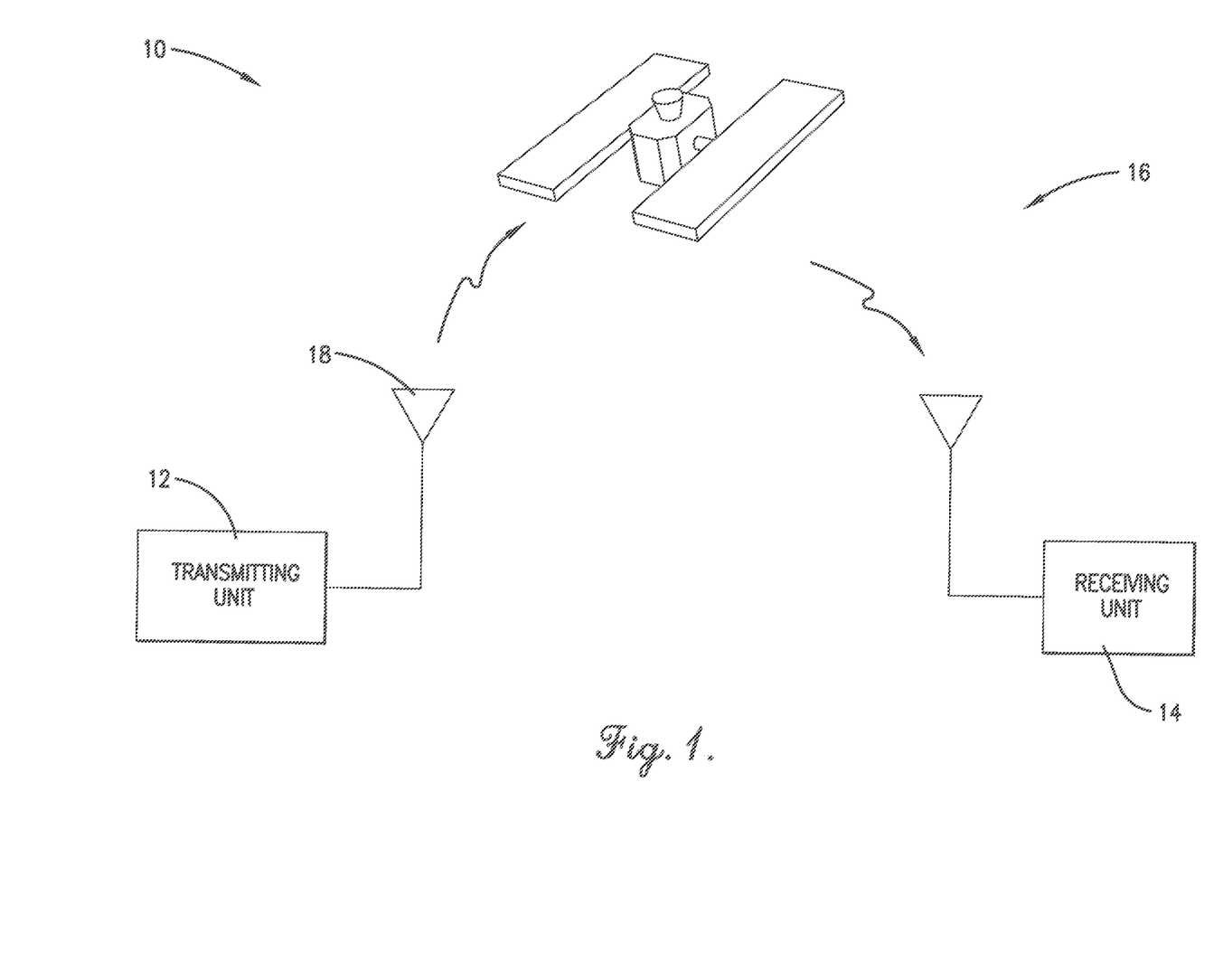
FIG. 1 is a schematic illustration of a transmitting unit, a satellite, and a receiving unit communicating over a wireless communication network in accordance with an embodiment of the present invention.
Figure 2:
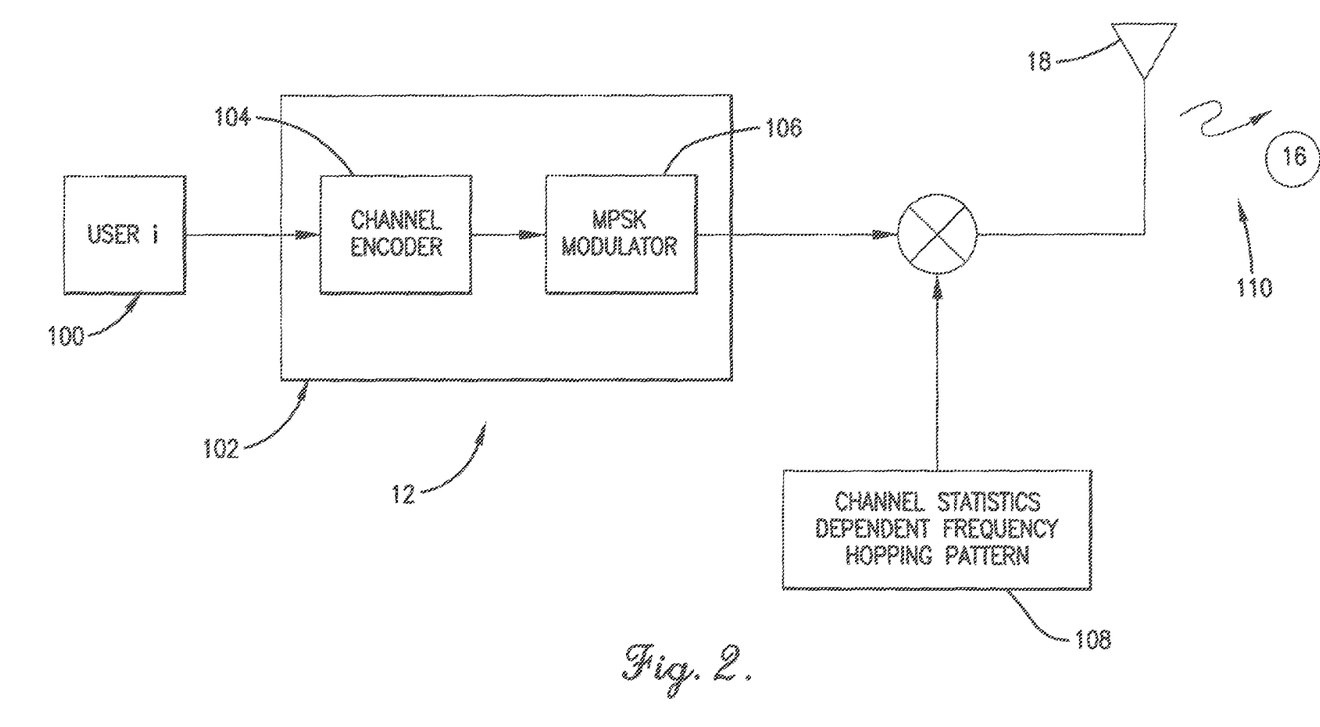
FIG. 2 is a flow diagram of signal transmission over the wireless communication network of FIG. 1.
Figure 3:
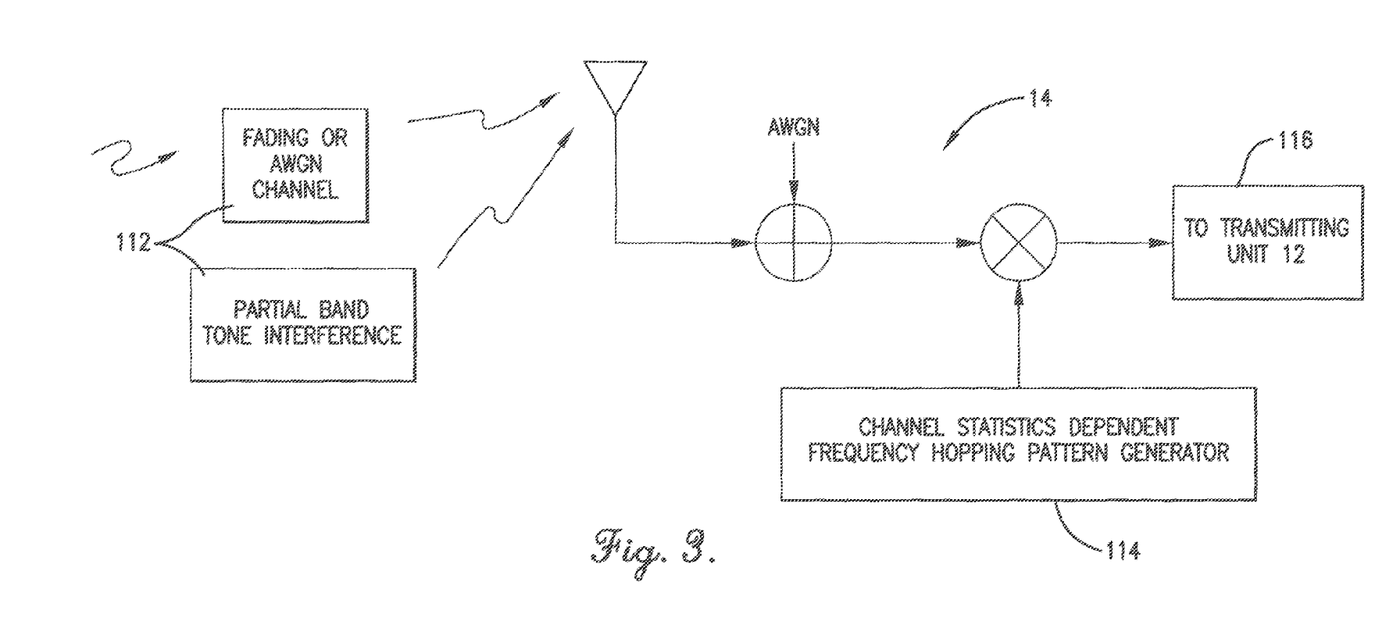
FIG. 3 is a continuation of the flow diagram of FIG. 2.

Turning now to the drawing figures, and particularly FIGS. 1-3, a wireless communication system 10 constructed in accordance with an embodiment of the invention is illustrated. The wireless communication system 10 broadly includes one or more transmitting units 12 and one or more receiving units 14. The wireless communication system 10 may employ intermediate communication nodes between the transmitting units 12 and the receiving units 14 for communicating over a wireless communication network 16, as described below.

The transmitting units 12 may be mobile smartphone devices, cellular devices, personal digital assistants, tablets, laptops, computers, radios, walkie-talkies, or any other device configured to communicate over the wireless communication network 16.

The wireless communication network 16 may be any wireless communication network such as a local area network, a wide area network, the internet, an intranet, or wireless networks such as the ones operated by AT&T, Verizon, or Sprint. The wireless communication network 16 may also be combined or implemented with several different networks.

The transmitting units 12 generate and transmit wireless communication signals and may be a "ground station" or other computing device including a processor, memory, transmitter 18 (e.g., transceiver), and/or other electronic circuitry or hardware or computer software for encoding the signals, modulating the signals, and transmitting the signals.

The processor may implement an application or computer program to perform some of the functions described herein. The application may comprise a listing of executable instructions for implementing logical functions in the user device. The application can be embodied in any computer readable medium for use by or in connection with an instruction execution system, apparatus, or device. The various actions and calculations described herein as being performed by or using the application may actually be performed by one or more computers, processors, or other computational devices, independently or cooperatively executing portions of the application.

The memory may be any computer-readable medium that can contain, store, communicate, propagate, or transport the application for use by or in connection with the instruction execution system, apparatus, or device. The computer readable medium can be, for example, but not limited to, an electronic, magnetic, optical, electro magnetic, infrared, or semiconductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof.

The intermediate nodes may be cellular towers, satellites (as shown in FIG. 1), relay stations, repeaters, computing devices (such as the ones described above) acting as relays, or any other unit configured to receive a wireless communication signal and transmit the signal to another relay or to one of the receiving units 14. The intermediate nodes may also be environmental objects such as buildings, ground surfaces, clouds, and other objects.

The receiving units 14 may be any computing device such as the computing devices described above and are configured to receive communication signals. For example, the receiving units 14 may be a "ground station" or other computing device including a processor, memory, transmitter (e.g., transceiver), and/or other electronic circuitry or hardware or computer software (as described above) for receiving signals, decoding signals, and demodulating signals. The receiving units 14 may also generate frequency hopping patterns as described below.

Turning again to FIGS. 2 and 3, a signal may be transmitted according to the following steps. It will be understood that steps may be performed in different orders or simultaneously. Some steps may be omitted in certain embodiments and additional steps may be incorporated without limiting the scope of the invention.

First, a transmitting unit 12 generates a signal to be transmitted from user i (reference number 100), as shown by block 102.

The transmitting unit 12 then encodes the signal via encryption or other suitable encoding protocol, as shown by block 104.

The transmitting unit 12 also modulates the signal via M-ary phase shift keying (MPSK) or other suitable modulation scheme, as shown by block 106.

The transmitting unit 12 also receives a channel statistics dependent frequency hopping pattern and superimposes or embeds the frequency hopping pattern onto the signal, as shown by block 108.

The transmitting unit 12 then transmits the signal over the wireless network 16, as shown by block 110.

The signal may be subjected to fading, additive white Gausian noise, and/or interference, as shown by block 112.

The receiving unit 14 receives the signal and generates a channel statistics dependent frequency hopping pattern, as shown by block 114. Generation of the adaptive channel statistics dependent frequency hopping pattern is described in more detail below.

The frequency hopping pattern is then transmitted from the receiving unit 14 and to the transmitting unit 12, as shown by block 116. The transmitting unit 12 may then apply the adaptive channel statistics frequency hopping pattern to the signal as the transmitting unit 12 continues to transmit over the wireless communication network 16.

Figure 4:
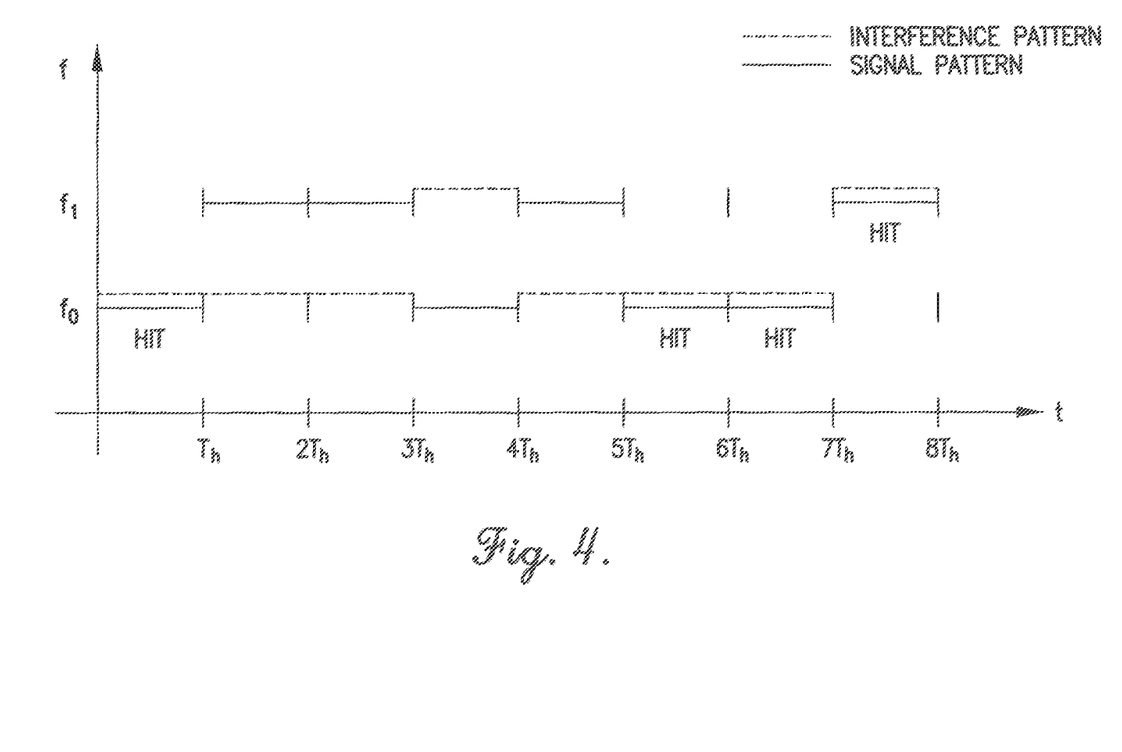
FIG. 4 is a graph of an exemplary frequency hopping pattern.

Turning to FIG. 4, a simplified graphical example of a frequency hopping pattern is shown. The frequency hopping pattern (shown in solid linetype) spans eight time slots (e.g., a frame) and two frequency channels. The frequency hopping pattern also has one symbol (data chunk) per time hop. An interference pattern (shown in dashed linetype) is shown spanning the same frequencies and occasionally interfering with the signal by occupying the same frequency and time slot as the signal (represented by "hits"). Adapting the signal according to the channel statistics influenced by the interference pattern is one of the goals achieved by the present invention.

Figure 5:
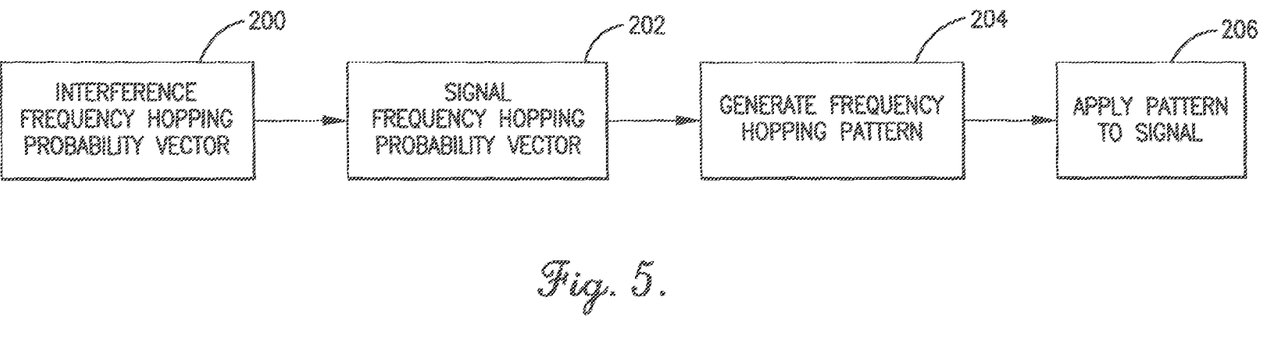
FIG. 5 is a flow diagram of channel statistics frequency hopping pattern generation in accordance with an embodiment of the present invention.
Figure 6:
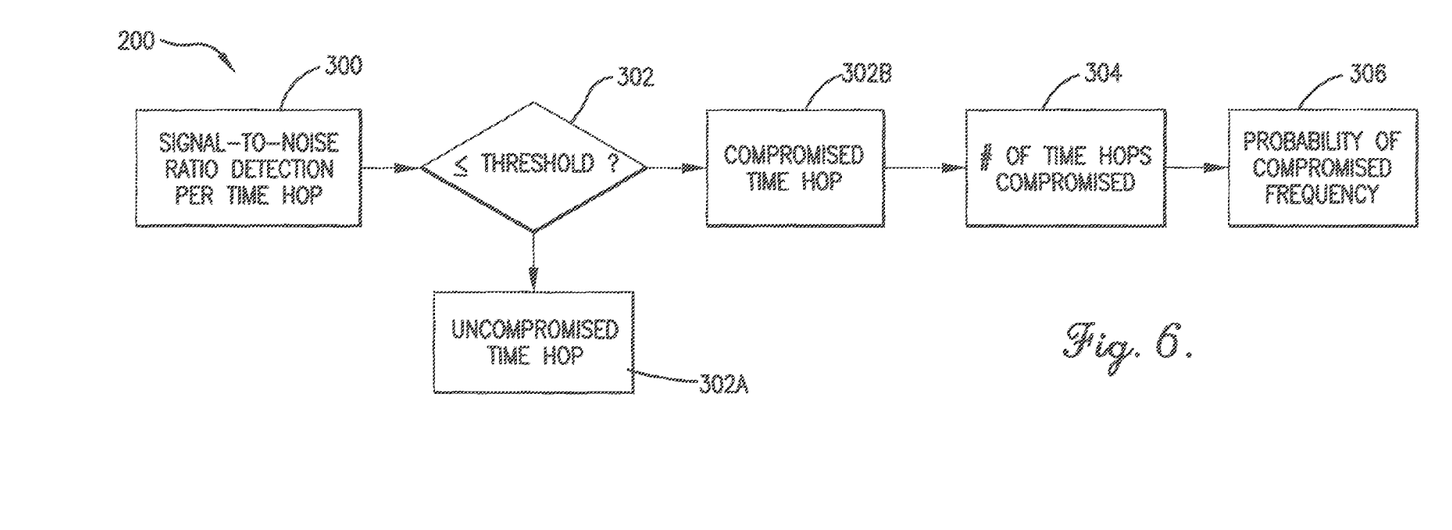
FIG. 6 is a flow diagram of interference frequency hopping probability vector generation in accordance with an embodiment of the present invention.
Figure 7:
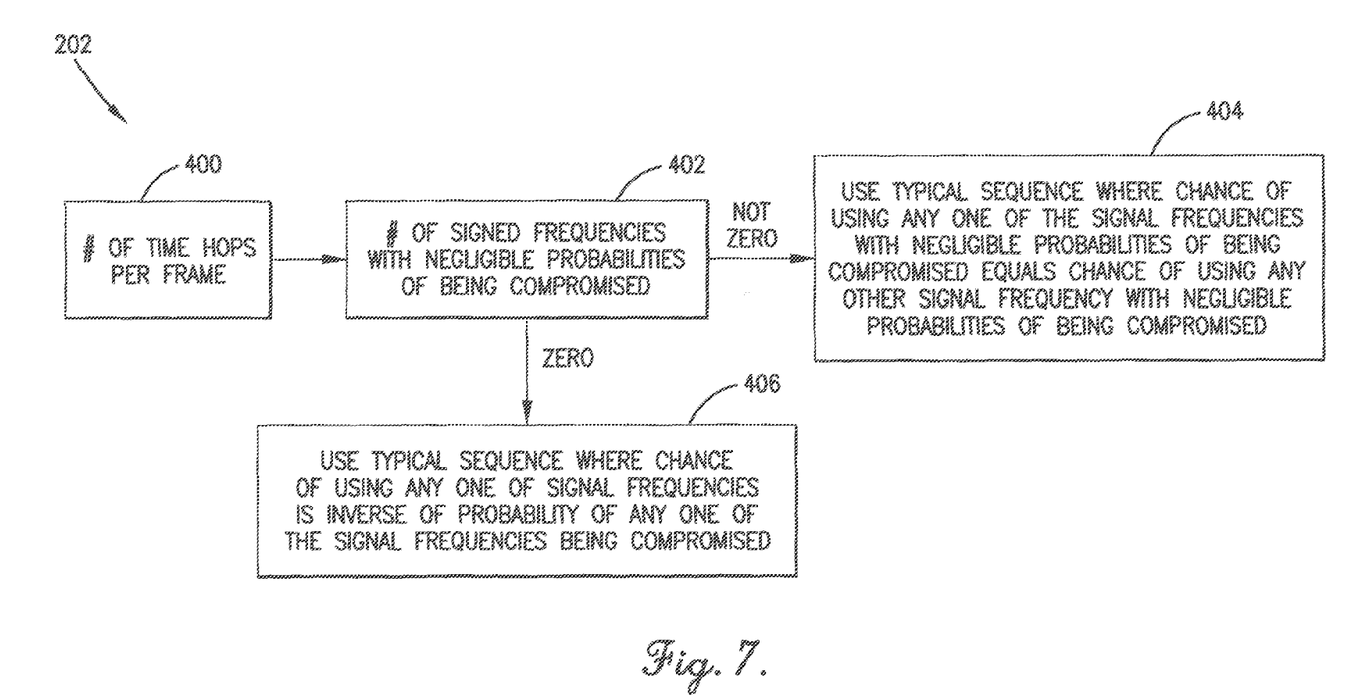
FIG. 7 is a flow diagram of signal frequency hopping probability vector generation in accordance with an embodiment of the present invention.

Turning to FIGS. 5-7, generation of the adaptive channel statistics dependent frequency hopping pattern will now be described. First, an interference frequency hopping probability vector may be determined, as shown by block 200 of FIG. 5 and in more detail in FIG. 6.

Next, a signal frequency hopping probability vector may be determined based on the interference frequency hopping probability vector, as shown by block 202 of FIG. 5 and in more detail in FIG. 7.

A frequency hopping pattern based on the interference frequency hopping probability vector and signal frequency hopping probability vector may then be determined, as shown by block 204.

The signal may then be modified according to the frequency hopping pattern, as shown by block 206.

Determination of the interference frequency hopping probability vector will now be described. First the signal energy received in each time hop is calculated, as shown by block 300 (FIG. 6). That is, the signal-to-noise ratio is measured at each time hop.

The received signal-to-noise ratio (SNR) for the signal for time hop may be compared to a threshold, as shown by block 302. If the received SNR for the signal in a given frequency is greater than the predetermined threshold, that frequency is deemed to be uncompromised, as shown by block 302A. If the received SNR from the frequency is less than a predetermined threshold, that frequency is deemed to be compromised, e.g., via interference, as shown by block 302B.

The number of frequency hops that are compromised for each frequency during a frame of multiple time hops is counted, as shown by block 304.

The probability that a frequency itself is compromised is then determined, as shown by block 306. For example, the probability that a frequency is compromised may be equal to the number of time hops compromised divided by the number of frequency hops per frame.

Determination of the signal frequency hopping probability vector will now be described. First, an actual number of time hops is calculated based on the number of frequency hops per frame, as shown by block 400 (FIG. 7).

The number of signal frequencies with negligible probabilities of being compromised may then be counted, as shown by block 402. If this number is not zero, then a signal frequency hopping probability vector based on the interference frequency hopping probability vector may then be determined using a Typical Sequence such that the chance of using any one of the signal frequencies with negligible probabilities of being compromised is equal to the chance of using any other one of the signal frequencies with negligible probabilities of being compromised, as shown in block 404. Conversely, if the number of signal frequencies with negligible probabilities of being compromised is zero, then a Typical Sequence may be generated such that the chance of using any one of the signal frequencies is inverse of the probability of any one of the signal frequencies being compromised 406.

In determining the Typical Sequences above, Core Typical Sequences may be used. That is, if the number of signal frequencies with negligible probabilities of being compromised is not zero, a Core Typical Sequence may be used such that the chance of using any one of the signal frequencies with negligible probabilities of being compromised multiplied by the number of time hops per frame is equal to the number of time hops per frame divided by the number of signal frequencies with negligible probabilities of being compromised. If the number of signal frequencies with negligible probabilities of being compromised is zero, a Core Typical Sequence may be used such that the chance of using any one of the signal frequencies is inverse of the probability of any one of the signal frequencies being compromised multiplied by the number of time hops per frame.

Turning again to FIGS. 2-6, an analytical discussion of the generation of the channel statistics dependent frequency hopping pattern (described above) follows. It will be understood that many of the equations, parameters, and assumptions used herein are merely for illustration purposes and are not intended to limit the scope of the invention.

In the following discussion, neither instantaneous channel state information (CSI) nor quasi-static CSI is assumed. Instead, the statistical information of CSI at each tone frequency may be used. At the end of each data frame, the number of time hops that are compromised at each tone frequency in the entire spectrum may be counted. The SNR may be measured at each time hop. If the measured SNR is lower than a predetermined threshold, it can be assumed that the frequency hop has been compromised. In practice, a frequency hopping system may employ multiple hops per frame such as 320 hops/frame. This number would be sufficient to approximate the probabilities of each tone frequency having interference by taking a single frame or a certain number of data frames (i.e., an epoch). These probabilities are not likely to change quickly. Hence, channel statistics are available for use in generating a channel statistic dependent frequency hopping sequence.

Notations for the following discussion are as follows. The expectation of a random variable X may be denoted as E[X]; a vector is denoted by the bold lower case, e.g., x; the transpose of a vector is denoted as $x^T$; the norm of a vector is denoted as $\|x\|$; the magnitude of a complex number is denoted as $|x|$; the largest integer smaller than or equal to a number is denoted as $\lfloor x \rfloor$; the inner product between two vectors is denoted as $\langle x,y \rangle$.

In reference to the signal transmitted between the transmitting unit 12 and receiving unit 14, a message W is drawn from the index set $\{1, 2, \ldots, 2^R\}$, where R denotes the transmission data rate, and a channel encoder maps the drawn message into a codeword $X^n(W)$ and transmits it through a discrete memoryless channel (DMC) $p(y|x)$. Then, the receiving unit 14 receives a random sequence $Y^n$ with channel transition probability $p(y^n|x^n)$. This can be written as $$p(y^n | x^n) = \prod_{i=1}^{n} p(y_i | x_i).$$

The decoder then decodes the received codeword $Y^n$ into an estimate of message $\hat{W}$.

In this discussion, a DMC model is adopted and one symbol (of multiple bits) transmission per hop is assumed. The results are still applicable for multiple symbols per hop because each transmitted and received symbol is independent of each other due to a memoryless channel. Also, the DMC model assumes a hard decision value at the demodulator, where each received symbol signal is demodulated individually for the decoder instead of using the received soft value.

For numerical results, an MPSK symbol may be assumed to be transmitted through a Rician fading channel with Rician factor K under additive white Gausian noise (AWGN) and partial band tone interference (PBTI) environments (block 112 of FIG. 3). Other modulations such as M-ary quadrature amplitude modulation (MQAM) and other fading such as Rayleigh and Nakagami may also be included. Furthermore, it may be assumed that the receiver 14 measures the SNR at every hop (block 300 of FIG. 5) and compares it with the required SNR threshold Th (block 302). If the received SNR over a hop is smaller than Th, then it is assumed that the signal during the hop is interfered with by PBTI or friendly multiple access (MA) users. The receiving unit 14 counts the number of compromised hops at each frequency hopping tone frequency $f_i$, i=0, ..., $N_f$-1 (block 304), and calculates the ratio of the number of compromised hops over the total number of hops at the end of a certain period such as an epoch or a data frame of $N_h$=320 hops (sufficient to represent the compromised probability). The ratio at the frequency hopping tone frequency $f_i$, for i=0, ..., $N_f$-1 is denoted as $p_i^J$ (306). This probability may be represented as $$Pr(\text{tone } f_i \text{ is compromised via a } PBTI) =$$
$$p_i^J = \frac{\text{Number of hops compromised at tone } f_i}{\text{Total number of hops in a data frame}}.$$

The interference probability frequency hopping vector $p^J = (p_0^J, \ldots, p_{N_f-1}^J)^T$ may be constructed, as shown in block 200, and it may be assumed that the interference probability is available at the transmitting unit 12 for the next data frame transmission through feedback from the receiving unit 14.

Having calculated an interference probability frequency hopping vector, a signal frequency hopping probability vector may be calculated (block 202). For illustrative purposes, an optimum signal frequency hopping probability vector $p^S = (p_0^S, \ldots, p_{N_f-1}^S)^T$ may be constructed, which maximizes the channel capacity and minimizes the symbol error rate (SER) of the frequency hopping signal for a given interference probability. This can be written as $$p_{opt}^S = \underset{p^S}{\operatorname{argmin}} \langle p^J, p^S \rangle$$

under probability constraints $p_i^S \geq 0$, i=0, ..., $N_f$-1, and $\langle 1, p^S \rangle = \sum_{i=0}^{N_f-1} p_i^S = 1$ where $1=(1, \ldots, 1)^T$.

An optimum signal frequency hopping probability vector $$p_{opt}^S = \underset{p^S}{\operatorname{argmin}} \langle p^J, p^S \rangle,$$

which simultaneously maximizes the channel capacity and minimizes the SER for a given frequency hopping probability vector, and satisfies the probability constraints $$p_{opt}^S = \underset{p^S}{\operatorname{argmin}} \langle p^J, p^S \rangle \text{ and } p_{opt}^s = \underset{p^S}{\operatorname{argmin}} \langle p^J, p^S \rangle$$

may be found by using a single-tone frequency with probability 1. The location of the single signal tone with probability 1 is the same as the tone location of PBTI with minimum probability. This can be written as $$p_{opt}^S = (0, \ldots, 0, \underset{\uparrow}{1}, 0, \ldots 0)^T;$$
$$\phantom{p_{opt}^S = (0, \ldots, 0, }j$$

where $$j = \arg \min_{i \in \{0,1,\ldots,N_f-1\}} p_i^J.$$

If there are multiple tones in $p^J$ with minimum probability, then any one of them can be used for the single-tone location with probability 1. The optimum signal frequency hopping pattern therefore is just a single tone (i.e., no frequency hopping) located at the tone frequency used by PBTI with a minimum probability. If the transmitting unit 12 employs this optimum strategy, then both the probability of hits (interference) and the SER can be minimized. However, a malicious interferer can detect with high probability which single tone the transmitting unit 12 is using. The signal in this case would be exposed to the interferer or an eavesdropper with a high probability of detection. Hence, another frequency hopping pattern that can achieve both a low probability of hits and a low probability of detection may be desired.

Typical Sequence based signal frequency hopping patterns (discussed in blocks 402-406) overcome this problem. A signal frequency hopping probability vector $p^S$ is denoted by $p_{uniform}^S$ and $p_{inverse}^S$ for Core Typical or Typical Sequence based frequency hopping pattern generations, respectively. The $i^{th}$ component $p_{i,inverse}^S$ of $p_{inverse}^S$ represents the ratio (or probability) of the number of hops that the channel frequency $f_i$ is used by the transmitter over the total number of hops in a data frame. The $p_{inverse}^S$ is obtained by taking the inverse of the interference frequency vector $p^J$.

Typical Sequences, and the special cases of Core Typical Sequences, will now be defined. For a Typical Sequence, the Typical set $A_\epsilon^{(n)}$ with respect to the probability mass function p(x) is the set of sequences $(x_1, \ldots, x_n) \in \mathcal{X}^n$ having the property $2^{-n(H(X)+\epsilon)} \leq p(x_1, \ldots, x_n) \leq 2^{-n(H(X)-\epsilon)}$ where $\epsilon$ is a positive small number, $\chi$ is the alphabet of random variable X, and H(X) is the entropy of X, such that $H(X)=-\Sigma_{x \in \chi} p(x) \log_2 p(x)$. Here, the random variable X does not represent the transmitted symbol but rather the frequency channel used by the frequency hopping system at the current hop. Also, the alphabet of X is $\chi=\{f_0, \ldots, f_{N_f-1}\}$. The sequence length is $n=N_h$ number of hops in a data frame, which is a sufficiently large number. The Typical Sequence with the empirical entropy $$\left(-\frac{1}{n}\log_2 p(x^n)\right)$$

is $\epsilon$-close to the true entropy H(X). Entropy means the uncertainty, and it is desirable to enhance the uncertainty of the frequency hopping pattern so that an interferer may have a low detection probability.

The number of Typical Sequences is approximately equal to $2^{nH(X)}$ and is bounded between $2^{n(H(X)-\epsilon)}$ and $2^{n(H(X)+\epsilon)}$. Hence, the number of Typical Sequences is exponentially growing with the frequency hopping pattern length n. However, it is not necessary to search all of these Typical Sequences for a finite number of multiple access users. Instead, the search can be restricted to a set of Core Typical Sequences. The number of frequencies $f_i$ being used in a data frame of $N_h$ can be denoted as $n_i$. If $n_i = \lfloor p_i^S N_h \rfloor$, i.e., $$p_i^S \approx \frac{n_i}{N_h}$$

for all $i=0, 1, \ldots, N_f-1$ and $\Sigma_{i=0}^{N_f-1} n_i \approx N_h$, then the Typical Sequence is a Core Typical Sequence. All Core Typical Sequences have the same properties. For example, all Core Typical Sequences have the same probability of being hit by partial band tone interference, and they are the $\epsilon$-closest to the true entropy H(X), i.e., $$\left| -\frac{1}{N_h} \log_2 p(x^{N_h}) - H(X) \right|$$

is the smallest among all Typical Sequences of length $N_h$ for a given probability mass function of p(x) of X. When $n_i = \lfloor p_i^S N_h \rfloor$ is ordered with $n_0$ as the largest, the number of Core Typical Sequences is calculated as $$N_{core\ typical\ seq} = \binom{N_h}{n_0} \binom{N_h - n_0}{n_1} \cdots \binom{N_h - n_0 - n_1 - \ldots - n_{N_f-2}}{n_{N_f-1}}.$$

Thus, an empirical partial band tone interference frequency hopping probability mass vector $p^J$ with low complexity may be obtained.

With reference to FIG. 5 and the above Typical Sequence analysis, a signal frequency hopping probability mass vector $p^S$ of signal frequency hopping random variable X may be determined as follows. First, an interference frequency hopping statistics vector $p^J = (p_0^J, \ldots, p_{N_f-1}^J)^T$ is obtained for every data frame (or epoch) using a signal to noise ratio threshold test performed at every hop, where $p_i^J$ denotes the ratio of number of compromised hops at frequency $f_i$ over total number of hops per frame (or epoch) (block 300). Then frequencies $f_{\pi_j}$ with negligible probabilities $0 \leq p_{\pi_j}^J \leq \epsilon$ for small positive $\epsilon$ maybe found (blocks 302-306). In other words, uncompromised frequencies that an interfering actor has never used or has used with very low probability may be found. The number of uncompromised frequencies in the entire spectrum may be denoted $N_{UJ}$ (block 402). If the number of uncompromised frequencies in the entire spectrum is not zero (refer to block 404), then entropy H(X) may be computed and a Typical Sequence using $$p_{uniform}^S = \left( p_{\pi_0}^S, \ldots, p_{\pi_{N_{UJ}-1}}^S \right)^T = (1/N_{UJ}, \ldots, 1/N_{UJ})^T$$

may be generated. Values of which are in the range between $f_{\pi_0}$ and $$f_{\pi_{N_{UJ}-1}}$$

with equal probabilities $p_{\pi_j}^S = 1/N_{UJ}$. In this case, X denotes a random variable of frequency hopping tone frequency being used, and $j=0, \ldots, N_{UJ}-1$. Alternatively, a Core Typical Sequence may be generated using $$p_{uniform}^S = \left( p_{\pi_0}^S, \ldots, p_{\pi_{N_{UJ}-1}}^S \right)^T = (1/N_{UJ}, \ldots, 1/N_{UJ})^T.$$

That is, a tone frequency $f_{\pi_j}$ where $p_{\pi_j}^S \cdot N_{frame} = N_{frame}/N_{UJ}$ is used. A uniform number generator or hopping keystream from an end cryptographic unit (e.g., receiving unit 14) may be used to find a time hop location of $f_{\pi_j}$ in frame for $j=0, \ldots, N_{UJ}-1$. If the number of uncompromised frequencies in the entire spectrum is zero (refer to block 406), then inverse probabilities are computed and used as signal frequency hopping probabilities where $$p_{i,inverse}^S = \frac{1/p_i^J}{\sum_{j=0}^{N_f-1} 1/p_j^J}$$

for $i=0, \ldots, N_f-1$. Then, entropy H(X) of X using $p_{inverse}^S$ is computed. A Typical Sequence of which values are in the range between $f_0$ and $f_{N_f-1}$ with probabilities $p_{inverse}^S$ $i=0, \ldots, N_f-1$ is generated. Alternatively, a Core Typical Sequence using $p_{inverse}^S$ may be generated. That is, tone frequency $f_i$ with $p_{inverse}^S \cdot N_{frame}$ number of times during frame $i=0, \ldots, N_f-1$ is used, where the number of hops per frame is denoted as $N_{frame}$. A uniform number generator or hopping keystream coming from an end cryptographic unit (e.g., receiving unit 14) may be used to find hop location of $f_i$ for $i=0, \ldots, N_f-1$.

Note that for multiple frequency hopping pattern generations for $N_u$ number of multiple access users, Hamming distances between generated frequency hopping patterns for user k and user l should be as maximum as possible in order to minimize or avoid multiple access interference (MAI). Note also that when all multiple access users (MAU) generate their frequency hopping patterns using the same signal frequency hopping vector $p^S = (p_0^S, \ldots, p_{N_f-1}^S)^T$, the maximum number of multiple access users that can be supported by the frequency hopping system with no multiple access interference may be calculated as $$N_{U,max\ with\ no\ MAI} = \left\lfloor \frac{1}{\max_i \{p_i^S\}} \right\rfloor$$

where $i=0, \ldots, N_f-1$.

Symbol error probability of frequency hopping M-ary phase shift keying (MPSK) under Rician fading and partial band tone interference can be determined as $$p_{cr}^J = \frac{1}{\pi} \int_0^{(M-1)\pi/M} \frac{(1+K)}{(1+K) + \frac{g}{\sin^2 \varnothing} \bar{\gamma}_J} \exp\left[ \frac{-K \frac{g}{\sin^2 \varnothing} \bar{\gamma}_J}{(1+K) + \frac{g}{\sin^2 \varnothing} \bar{\gamma}_J} \right] d\varnothing \text{ and}$$

$$p_{cr}^{UJ} = \frac{1}{\pi} \int_0^{(M-1)\pi/M} \frac{(1+K)}{(1+K) + \frac{g}{\sin^2 \varnothing} \bar{\gamma}_N} \exp\left[ \frac{-K \frac{g}{\sin^2 \varnothing} \bar{\gamma}_N}{(1+K) + \frac{g}{\sin^2 \varnothing} \bar{\gamma}_N} \right] d\varnothing$$

where $g = \sin^2 \frac{\pi}{M}$, and $\bar{\gamma}_J$ and $\bar{\gamma}_N$ denote, respectively, the average signal-to-interference-plus-noise ratio (SINR) when compromised and the average SNR when uncompromised. These are $$\bar{\gamma}_J = \frac{1}{\left(\frac{1}{\beta E_S/N_J} + \frac{1}{E_S/N_0}\right)} \sqrt{\pi/2}\, e^{-K/2}\left[(1+K)I_0\left(\frac{K}{2}\right) + KI_1\left(\frac{K}{2}\right)\right] \text{ and}$$

$$\bar{\gamma}_N = \frac{E_S}{N_0}\sqrt{\frac{\pi}{2}}\, e^{-K/2}\left[(1+K)I_0\left(\frac{K}{2}\right) + KI_1\left(\frac{K}{2}\right)\right],$$

where $I_0(x)$ and $I_1(x)$ are the zeroth-order and first-order modified Bessel function of the first kind, respectively, K is the Rician factor, $E_S/N_0 = (\log_2 M)\, E_b/N_0$ is the symbol-energy-to-noise power spectral density ratio. $E_S/N_J = (\log_2 M)\, E_b/N_J$ is the symbol-energy-to-interference power spectral density ratio, $E_b$ is the bit energy, and $\beta$ denotes the PBTI fraction ratio, which is related to the probability of being interfered with or hit through $\beta = (1 - N_{IJ}/N_f)$.

The present invention advantageously improves the process of wireless signal transmission. For example, the present invention may be used for reducing the probability of hits in frequency by an interferer and safeguarding communications more effectively. The present invention also provides improved performance under multiple access interference.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of transmitting data over a wireless communication network, the method comprising the steps of:
    generating a signal divided into epoch time intervals and further divided into time hop intervals;
    performing a compromised measurement at each of said time hop intervals of one of said epoch time intervals;
    determining an interference probability mass function by counting a number of compromised time hops at the one of said epoch time intervals;
    determining a signal probability mass function having a small inner product between said signal and said interference probability mass function;
    applying an inverse method to said interference probability mass function to find said signal probability mass function;
    generating a hopping sequence by determining a number of time hops to be used during said epoch time interval at each hopping frequency, the time hops being determined by multiplying said epoch time length to the probability at each hopping frequency of said signal probability mass function, wherein the hopping sequence is a core typical sequence;
    permuting said core typical sequence;
    generating a frequency hopping pattern according to the permuted core typical sequence;
    defining a pool of all frequency hopping pattern candidates via said signal probability mass function and an information theory based typical sequence;
    selecting a subsequent frequency hopping pattern from the pool of frequency hopping pattern candidates such that said subsequent frequency hopping pattern is adaptively dependent upon said interference probability mass function spanning over said plurality of signal frequencies;
    incorporating said subsequent frequency hopping pattern into said signal; and
    transmitting the signal.

2. The method of claim 1, wherein the signal is received by a receiving unit and the subsequent frequency hopping patterns are generated by the receiving unit via the generated frequency hopping pattern index information upon receiving the signal.

3. The method of claim 1, wherein the step of determining an interference frequency hopping probability mass function includes the steps of:
    measuring a signal-to-noise ratio at each time hop and at each frequency; and
    if the measured signal-to-noise ratio is lower than a predetermined threshold, count the current time hop as being compromise,
    wherein an interference frequency hopping probability mass function value at a given frequency during a current epoch time interval is the ratio of the number of compromised hops over the total number of hops at the given frequency in the current epoch time interval.

4. The method of claim 1, wherein groups of time hops comprise an epoch time interval, and the step of determining an interference frequency hopping probability mass function includes the step of counting a number of time hops compromised at each signal frequency.

5. The method of claim 3, wherein the step of measuring a signal-to-noise ratio is measured at the end of each time hop, and the value of said interference frequency hopping probability mass function at each frequency for each epoch interval is measured at the end of each epoch time interval.

6. The method of claim 4, wherein the step of determining an interference frequency hopping probability mass function is performed for an individual epoch time interval.

7. The method of claim 4, wherein the step of determining an interference frequency hopping probability mass function is performed over a number of epoch time intervals.

* * * * *